United States Patent [19]
Cussac

[11] Patent Number: 6,062,511
[45] Date of Patent: May 16, 2000

[54] DEVICE FOR ADJUSTING A SOLAR PANEL ON A SPACECRAFT, AND SPACECRAFT EQUIPPED WITH SUCH A DEVICE

[75] Inventor: Thibéry Cussac, Toulouse, France

[73] Assignee: Centre National d'Etudes Spatiales, Paris, France

[21] Appl. No.: 08/930,253

[22] PCT Filed: Mar. 27, 1996

[86] PCT No.: PCT/FR96/00454

§ 371 Date: Sep. 26, 1997

§ 102(e) Date: Sep. 26, 1997

[87] PCT Pub. No.: WO96/30259

PCT Pub. Date: Oct. 3, 1996

[30] Foreign Application Priority Data

Mar. 28, 1995 [FR] France .................................. 95 03610

[51] Int. Cl.[7] .................................................. B64G 1/36
[52] U.S. Cl. ........................... 244/168; 244/173; 136/292
[58] Field of Search ................................... 244/173, 168, 244/164; 136/246, 292; 126/600

[56] References Cited

U.S. PATENT DOCUMENTS

| | | | |
|---|---|---|---|
| 3,304,028 | 2/1967 | Dryden | 244/168 |
| 3,311,322 | 3/1967 | Zimmerman | 244/168 |
| 3,630,020 | 12/1971 | Chase et al. | 244/168 |
| 4,091,799 | 5/1978 | Steiner | 136/246 |
| 4,155,524 | 5/1979 | Marello et al. | 244/173 |
| 5,257,759 | 11/1993 | Bender | 244/168 |
| 5,310,144 | 5/1994 | Salvatore et al. | 244/168 |

FOREIGN PATENT DOCUMENTS

| | | | |
|---|---|---|---|
| 311026 | 4/1989 | European Pat. Off. | 244/173 |
| 1-237296 | 9/1989 | Japan | 244/173 |

*Primary Examiner*—Peter M. Poon
*Assistant Examiner*—Elizabeth Shaw
*Attorney, Agent, or Firm*—Pollock Vande Sande & Amernick

[57] ABSTRACT

A device for angularly positioning a solar panel equipping a spacecraft such as a satellite, the panel being connected in hinged manner to the body of the spacecraft. The device comprises a heat-sensitive drive mechanism suitable for causing the panel to be displaced relative to the body of the spacecraft automatically as a function of the direction of incidence of the solar radiation on the spacecraft. The drive mechanism is suitable for taking up two states as a function of its temperature, and is so disposed on the spacecraft that a change in the direction of incidence of the solar radiation on the spacecraft is accompanied by a change in the temperature of the drive mechanism causing a change of a state therein and a change in the angular position of the panel tending to reduce the angle of incidence of the solar radiation on the panel.

6 Claims, 2 Drawing Sheets

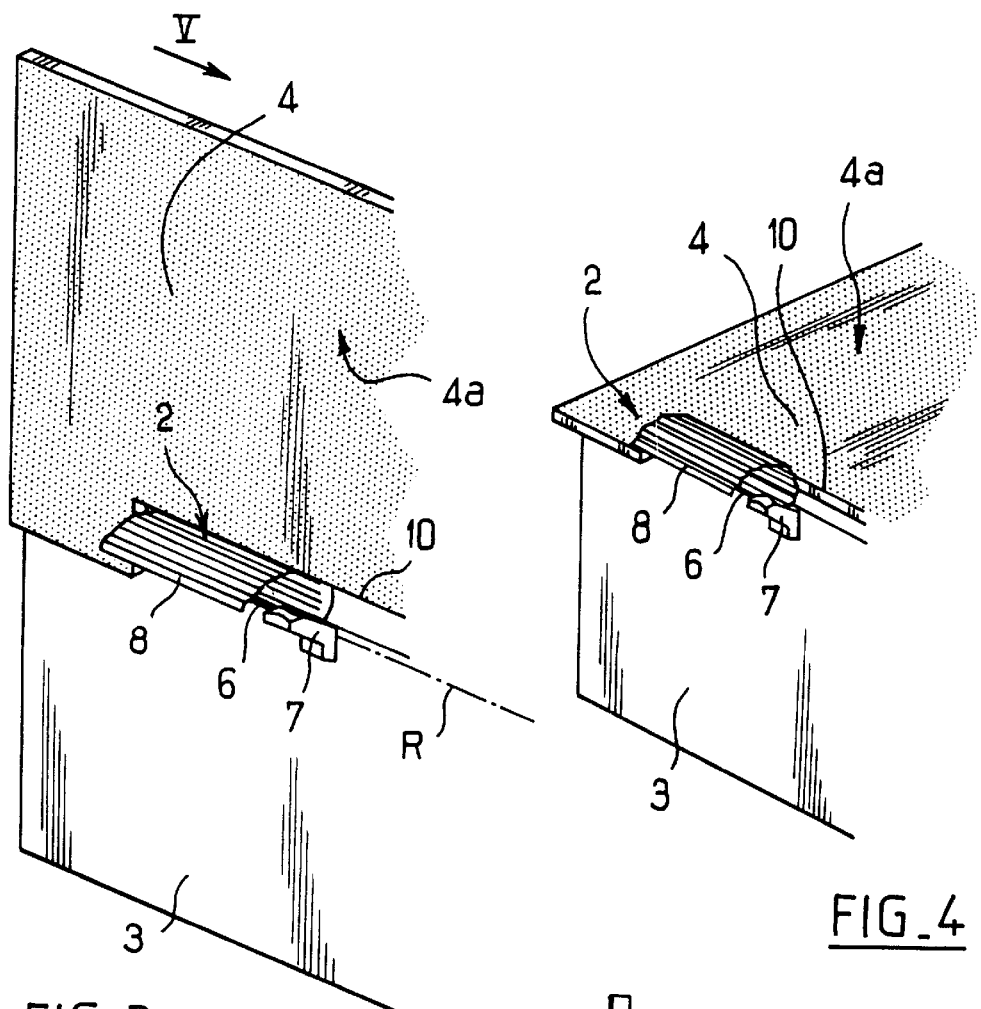
FIG_3
FIG_4
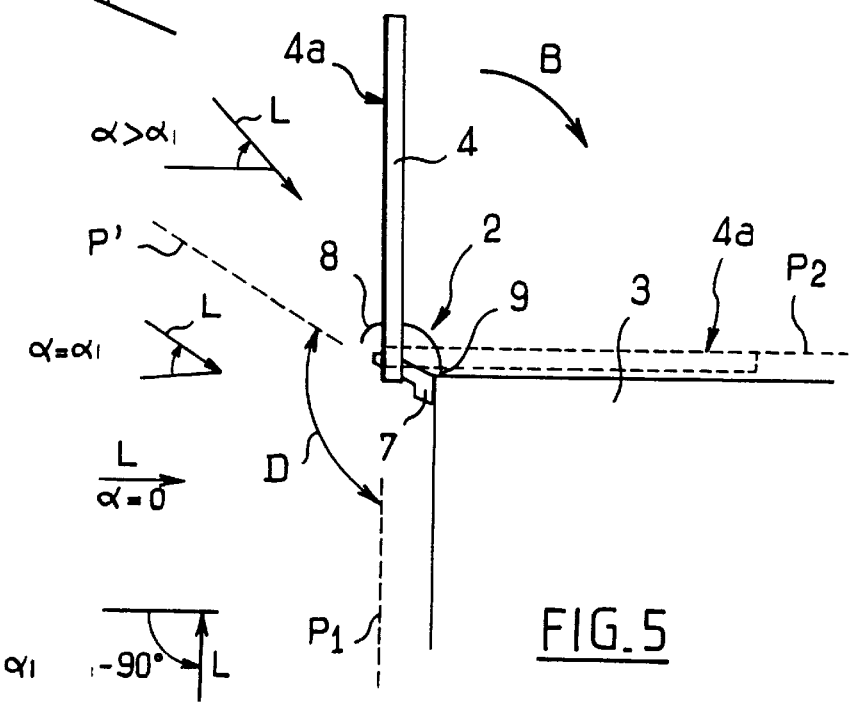
FIG_5

DEVICE FOR ADJUSTING A SOLAR PANEL ON A SPACECRAFT, AND SPACECRAFT EQUIPPED WITH SUCH A DEVICE

FIELD OF THE INVENTION

The present invention relates to space applications, and more particularly to a device for angularly positioning a solar panel equipping a spacecraft such as a satellite.

BACKGROUND OF THE INVENTION

The electrical power delivered by a solar panel depends in particular on its surface area and on the angle of incidence of the solar radiation on the panel. The efficiency per unit area of a solar panel can be defined as the electrical power produced per unit area of the panel. When a solar panel is fixed to the body of a satellite without it being possible to change the angular position of the panel relative to the body of the satellite, the efficiency per unit area depends directly on the angular position of the satellite relative to the sun. Since the angular position of the satellite changes as it travels over its orbit, the mean efficiency per unit area over one revolution is quite low.

To increase the mean efficiency per unit area, it has been proposed to mount the solar panel in a hinged manner on the body of the satellite and to angularly position the panel as well as possible relative to the incident solar flux by means of one or more electric motors and of their control electronic circuitry controlled by a processing unit on board the satellite (which unit manages all of the equipment on board the satellite). The angular positioning device operating properly thus depends on the control electronic circuitry and the processing unit on board the satellite operating properly. This is a drawback insofar as failure of any of these elements might cause a drop in the output of electrical energy, and ultimately might cause all of the electrical equipment on the satellite to stop. Another drawback lies in the complexity of the angular positioning device and in the associated risk of breakdown.

It has also been proposed to equip a space vehicle with a heat-sensitive device suitable for generating torque as a function of exposure to solar radiation, and designed to avoid oscillation phenomena (U.S. Pat. No. 3,311,322).

A heat-sensitive device has also been proposed that is actuated by solar radiation and that is suitable for generating torque for angularly positioning solar panels (U.S. Pat. No. 3,635,015).

SUMMARY OF THE INVENTION

The present invention provides a device for angularly positioning a solar panel equipping a spacecraft such as a satellite, the panel being connected in hinged manner to the body of the spacecraft, the device comprising a heat-sensitive drive mechanism suitable for causing the panel to be displaced relative to the body of the spacecraft as a function of the direction of incidence of the solar radiation on the spacecraft, said device being characterized in that said drive mechanism is designed to take up automatically, under the effect of its temperature, one or other of two states which differ from each other by a rotation through a determined angle, the first state being taken up for temperatures lower than a first value, and the second state being taken up for temperatures higher than a second value, said drive mechanism being connected to the panel so that said rotation is transmitted to the panel, and said drive mechanism being designed so that a predetermined change in the direction of incidence of the solar radiation on the spacecraft is accompanied by a change in the temperature of the drive mechanism causing said temperature to go from a a value lower than said first value to a temperature higher than said second value, or vice versa.

In a preferred embodiment of the invention, said drive mechanism is disposed on the spacecraft so that a predetermined change in the direction of incidence of the solar radiation on the spacecraft is accompanied by a variation in the temperature of the drive mechanism, and causes a change in the state thereof and in the angular position of the panel tending to reduce the angle of incidence of the solar radiation on the panel.

In a preferred embodiment of the invention, the drive mechanism is made of a double-acting shape-memory alloy.

In a preferred embodiment of the invention, the panel is mounted to pivot on the body of the spacecraft about an axis of rotation, and said drive mechanism is a torsion bar that is elongate along the axis of rotation, one axial end of the bar being connected to the body of the spacecraft, and the other axial end of the bar being connected to the panel, a change in the state of the bar being accompanied by a change in its shape causing its ends to rotate relative to each other and the panel to tilt.

In a preferred embodiment of the invention, the device is provided with a mask disposed about the drive mechanism so as to mask the incident solar radiation for a given set of directions of incidence of the solar radiation on the spacecraft.

In a preferred embodiment of the invention, the mask is suitable for transmitting a large portion of the solar energy it receives to the drive mechanism by radiant coupling, for a given set of directions of incidence of the solar radiation on the spacecraft.

The invention also provides a spacecraft equipped with an angular-positioning device as defined above.

BRIEF DESCRIPTION OF THE DRAWINGS

Other characteristics and advantages of the present invention appear on reading the following detailed description of an embodiment of the invention, and on examining the accompanying drawings, in which:

FIGS. 3 and 4 are fragmentary perspective views showing a solar panel and the body of the satellite on which it is hinged, in two positions respectively corresponding to two states of the drive mechanism; and FIG. 5 is a profile view of the panel and of the body of the satellite in the direction of arrow V shown in FIG. 3.

DESCRIPTION OF PREFERRED EMBODIMENT

Figure 1:
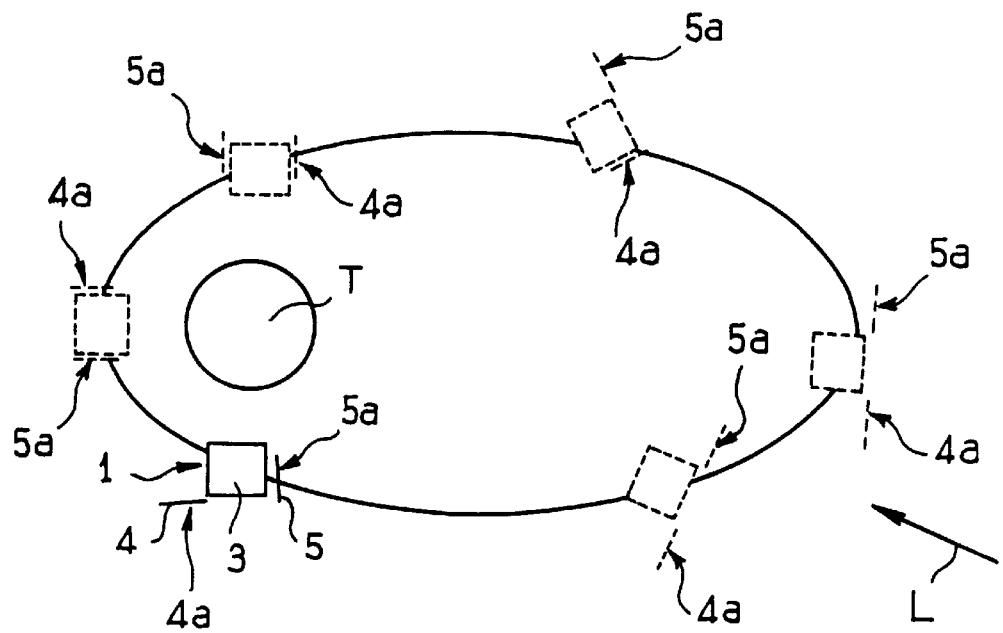
FIG. 1 schematically shows various angular positions of the satellite relative to the incident solar radiation during one revolution.

FIG. 1 shows a satellite 1 in orbit about the Earth T at six different instants during one revolution. In the example described, the satellite is placed on a slightly inclined geocentric orbit. Arrow L indicates the direction of the solar radiation. In the example described, the satellite 1 includes a body 3 and two solar panels 4 and 5 respectively hinged to opposite faces of the body 3. The panels 4 and 5 are mounted to pivot about parallel axes of rotation (only the axis of rotation R of panel 4 is shown in the figures). Each panel 4, 5 can pivot about its axis of rotation between a position in which it is deployed and a position in which it is folded, it being possible to go from one position to the other by rotating the panel through 90° as shown in FIGS. 3 and 4. On an "active" one of its faces 4a, 5a, each panel 4, 5 has solar cells suitable for generating electricity when they are illuminated by the sun. These cells are disposed on that face of the panel which faces outwards when the panel is folded against the body of the satellite.

A panel 4, 5 is tilted from one position to the other by a drive mechanism 2 which, in the example described, comprises a torsion bar 6 made of a double-acting shape-memory alloy and elongate along the pivot axis of the panel. The torsion bar 6 serves both as drive and as pivot. It is made in known manner from a nickel-titanium alloy or from any other double-acting shape-memory alloy known to a person skilled in the art, e.g. an alloy based on copper. Depending on its temperature, the torsion bar 6 takes up one of two states. More precisely, when its temperature is less than a first transition temperature $T_1$ (which may typically be about 0° C.), the torsion bar 6 has a shape corresponding to a first state, and when the temperature of the torsion bar 6 is greater than a second transition temperature $T_2$ (which may typically be about 60° C.), the torsion bar 6 has a shape corresponding to a second state, which shape differs from the first shape by a relative rotation through 90° of the ends of the torsion bar 6 about its longitudinal axis. When the temperature of the torsion bar 6 rises, from a starting temperature lower than the first transition temperature $T_1$, the torsion bar 6 retains its first state until the temperature exceeds the second transition temperature $T_2$. When the temperature falls again from a starting temperature higher than the second transition temperature $T_2$, the torsion bar 6 retains its second state so long as the temperature remains higher than the first transition temperature $T_1$. By connecting one axial end of the torsion bar 6 to a fixed support 7 secured to the body 3 of the satellite, and its other axial end to the associated panel, a change in the state of the torsion bar 6 causes the panel to tilt.

In the example described, a change in the temperature of the torsion bar 6 is caused by a change in the direction L of the solar radiation relative to a reference associated with the satellite. In FIG. 5, the direction L is indicated by the angle of incidence $\alpha$. When the angle $\alpha$ lies in the range $\alpha_{min}$ to $\alpha_{max}$ in FIG. 5, i.e. when the solar radiation arrives in the dihedron D which has its ridge coinciding with the axis of rotation of the panel and which is defined by the plane $P_1$ of the active face of the panel in the deployed position and by the plane P' which bisects the plane $P_1$ and the plane $P_2$ of the active face of the panel in the folded position, the torsion bar 6 is illuminated and its temperature is higher than the second transition temperature $T_2$. It can be noted that when the solar radiation arrives in the dihedron D, the efficiency per unit area of the panel is higher when the panel is deployed than when it is folded. The torsion bar 6 is disposed so as to be in a state corresponding to the panel being deployed when its temperature is higher than the second transition temperature $T_2$. In the example described, $\alpha_{min}=90°$ and $\alpha_{max}=45°$.

A mask 8 is disposed about the torsion bar 6 to serve as a screen against the incident solar radiation when the angle a is greater than $\alpha_{max}$, i.e. when the direction L of the solar radiation crosses the plane P' (in the direction in which the panel is folded) and it no longer reaches the torsion bar 6 via the dihedron D. The torsion bar 6 is then no longer illuminated and its temperature drops below the first transition temperature $T_1$, thereby causing the torsion bar 6 to undergo a change of state, and the panel to be folded (in the direction indicated by arrow B in FIG. 5). It can be noted that once the panel is folded, after the direction L of the solar radiation has crossed the plane P', the angle of incidence of the solar radiation on the panel is smaller than if the panel had remained deployed, so that the efficiency per unit area obtained after the panel has been pivoted is better than if the panel had not been rotated.

In the example shown, the mask 8 is in the form of a cylindrical wall whose generator line is parallel to the pivot axis R of the panel. The length of the mask 8, as measured along said pivot axis is not less than the length of the torsion bar 6. The mask 8 is fixed via one of its longitudinal edges 9 to that face of the body 3 against which the panel folds. That edge 10 of the panel 4 which is hinged to the body 3 is cut away to allow the mask 8 to pass. The mask 8 is concave facing the dihedron D. Its thermal properties, like those of the torsion bar 6, must be organized by any means known to persons skilled in the art to obtain the temperature variations necessary to change the state of the shape-memory alloy as a function of the position of the sun. In the example described, exchange by radiation and by conduction is limited both with the outside medium (e.g. by means of insulating the outside portion of the mask), and also with the satellite (by using insulating materials in the parts for fixing the bar and the mask to the satellite), and maximum radiant coupling from the mask 8 to the torsion bar 6 is sought by means of suitable paints or surface treatments.

Figure 2:
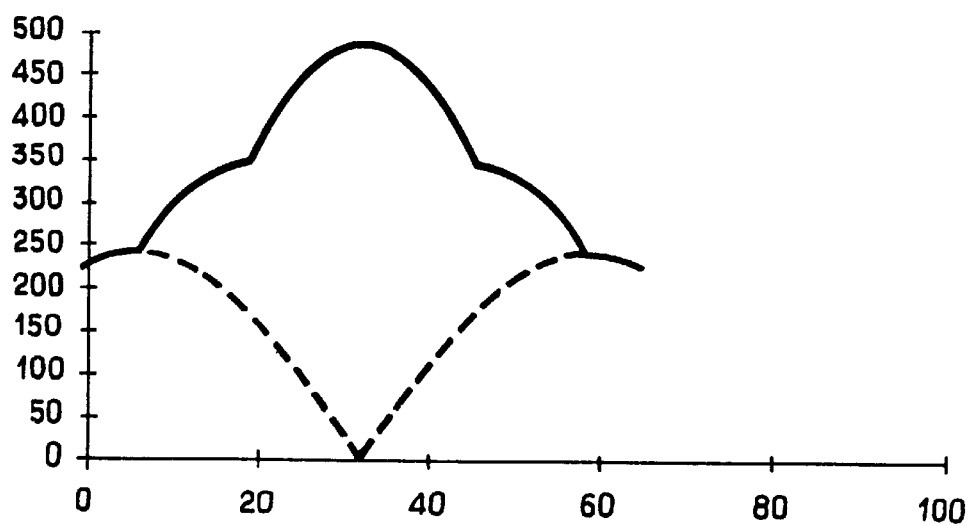
FIG. 2 shows, for purposes of comparison, the electrical power delivered by a pair of solar panels mounted in fixed manner on the body of a satellite and the electrical power delivered by a pair of solar panels mounted to be displaceable on the body of the satellite and displaced by drive mechanisms of the invention, power (in Watts) being indicated up the y-axis, and time (in minutes) being indicated along the x-axis.

By way of example, FIG. 2 shows the variations in the electrical power delivered by a prior art generator (dashed curve), of the type comprising two panels fixed to the body of a satellite (assumed to be rectangular block shaped) and by a solar generator of the invention (uninterrupted curve) comprising two panels hinged to the body of the satellite so as to tilt through 90° on a change of state of a double-acting shape-memory alloy, as described above. Each of the panels has a surface area of 1 $m^2$, and the orbit is of perigee 400 km, of apogee 1,000 km, and of inclination 7° on the equatorial plane. The power gain achieved by the invention makes it possible to reduce the area of the panels compared with prior generators having fixed panels. A person skilled in the art will note, on comparing the curves shown in FIG. 2, that, by means of the invention, it is possible to reduce the surface area of the solar panels by one half for a given electrical power to be delivered, compared with a prior art generator having fixed panels. The power delivered by panels angularly positioned in accordance with the invention is zero only while the satellite is being eclipsed, unlike a fixed-panel generator for which the delivered power is zero half way through the time interval between two consecutive eclipses. The invention advantageously makes it possible to reduce the number of discharging cycles of the battery fed by the solar panels, thereby increasing its life-span and that of the satellite.

The above-described angular-positioning device of the invention is entirely automatic, and particularly robust and reliable.

Naturally, the invention is not limited to this embodiment. In particular, it is possible to use an angular-positioning device of the invention to equip a spacecraft other than a satellite, regardless of whether the orbit is an Earth orbit, or an orbit about another celestial body or about the sun. The angular tilting of the panels may be different from 90°, and the spacecraft may be equipped both with fixed panels and with moving panels of the invention. In the example described, the drive mechanism comprises a torsion bar made of a double-acting shape-memory alloy. Without going beyond the ambit of the invention, it is possible to replace the torsion bar with traction springs, or with spring blades made of a double-acting shape-memory alloy, or, instead of using a double-acting shape-memory material, to use an assembly of a plurality of elements made of materials having different coefficients of thermal expansion, the assembly being formed so as to transform a variation in the temperature of the assembly into a displacement of its constituent elements, thereby causing a panel to tilt. In the example described, an increase in the temperature of the drive mechanism is caused by it being heated up under direct action from the incident solar radiation. In a variant, or in addition, the heat may be brought by means of a thermal conductor connecting the torsion bar to an element placed at a distance therefrom on the body of the satellite, the temperature of the element depending on the angular position of the satellite relative to the sun. In yet another variant, the torsion bar may be heated up by means of a heating resistor thermally coupled to the bar and fed with electrical energy by solar cells disposed and masked in accordance with the invention on the body of the satellite. It is also possible to displace a panel by means of a plurality of elementary drive mechanisms, each of which can take up one of two states as a function of its temperature, such elementary drive mechanisms being disposed in cascade so that their effects are accumulated, so as to have several degrees of tilt for the panel, thereby enabling the efficiency per unit area to be improved still further.

What is claimed is:

1. A device for angularly positioning a moving part equipping a spacecraft, the device comprising a heat-sensitive drive mechanism made of a double-acting shape-memory alloy, said drive mechanism being suitable for causing a panel to be displaced relative to a body of the spacecraft as a function of the direction of incidence of the solar radiation on the spacecraft and designed to be displaced under the effect of its temperature, said mechanism being connected to the moving part so that said displacement is transmitted to the moving part, wherein said moving part is a solar panel connected hingedly to the body of the spacecraft, and said drive mechanism is designed to take up automatically, under the effect of its temperature, one of two states which differ from each other by a rotation through a determined angle, a first one of said states being taken up for temperatures lower than a first value ($T_1$), and a second one of said states being taken up for temperatures higher than a second value ($T_2$), said drive mechanism being designed so that a predetermined change in the direction of incidence of the solar radiation on the spacecraft is accompanied by a change in the temperature of the drive mechanism causing said temperature to move between a value lower than said first value and a temperature higher than said second value, and by a change in the state thereof and in the angular position of the solar panel tending to reduce the angle of incidence of the solar radiation on said solar panel, and wherein said solar panel is mounted to pivot on the body of the spacecraft about an axis of rotation, and said drive mechanism is a torsion bar which is elongate along said axis of rotation, one axial end of said torsion bar being connected to the body of the spacecraft, and the other axial end of said torsion bar being connected to said solar panel, a change in a state of said torsion bar being accompanied by a change in a shape of said torsion bar causing said axial ends to rotate relative to each other and said solar panel to tilt.

2. The device according to claim 1, wherein the drive mechanism is connected thermally to an element disposed at a distance from the drive mechanism on the body of the spacecraft, and suitable for heating up said drive mechanism when said element is illuminated.

3. The device according to claim 1, wherein it is provided with a mask (8) disposed about the drive mechanism so as to mask the incident solar radiation for a given set of directions of incidence of the solar radiation on the spacecraft.

4. A device according to claim 3, wherein the mask (8) is suitable for transmitting a large portion of the solar energy it receives to the drive mechanism by radiant coupling, for a given set (D) of directions of incidence of the solar radiation on the spacecraft.

5. The device according to claim 1, wherein a change in the state of the drive mechanism occurs after the direction of the solar radiation relative to the spacecraft crosses a plane (P') bisecting two planes ($P_1$, $P_2$) respectively coinciding with the positions taken up by the panel before and after tilting.

6. The spacecraft equipped with a device as defined in claim 1.

* * * * *